United States Patent [19]

Woodward

[11] Patent Number: 5,417,055
[45] Date of Patent: May 23, 1995

[54] VALVE FOR DIVERTING FLUID FLOWS IN TURBOMACHINES

[75] Inventor: Clifford S. Woodward, Bristol, England

[73] Assignee: Rolls-Royce plc, London, England

[21] Appl. No.: 371,446

[22] Filed: Jun. 15, 1989

[30] Foreign Application Priority Data

Jun. 28, 1988 [GB] United Kingdom ............... 8815292
May 12, 1989 [GB] United Kingdom ............... 8910614

[51] Int. Cl.⁶ .................................................. F02K 3/02
[52] U.S. Cl. ............................ 60/226.3; 60/208; 60/269; 60/39.43
[58] Field of Search ............... 60/208, 226.3, 262, 60/269, 39.43

[56] References Cited

U.S. PATENT DOCUMENTS

| | | | |
|---|---|---|---|
| 3,702,681 | 11/1972 | Hasbrouck et al. | 60/262 X |
| 3,913,321 | 10/1975 | Snell | 60/226.3 |
| 4,038,818 | 8/1977 | Snell | 60/226.3 |
| 4,133,173 | 1/1979 | Schadow | 60/204 |
| 4,275,560 | 6/1981 | Wright et al. | 60/226.3 |
| 4,782,657 | 11/1988 | Lewis et al. | 60/226.3 X |
| 4,845,939 | 7/1989 | Jordan et al. | 60/226.3 X |

FOREIGN PATENT DOCUMENTS

| | | | |
|---|---|---|---|
| 1415509 | 11/1975 | United Kingdom . | |
| 2038947 | 9/1979 | United Kingdom | 60/226.3 |
| 2047815 | 12/1980 | United Kingdom . | |
| 2145160 | 3/1985 | United Kingdom . | |
| 2192940 | 1/1988 | United Kingdom | 60/226.3 |

*Primary Examiner*—Peter A. Nelson
*Attorney, Agent, or Firm*—Oliff & Berridge

[57] ABSTRACT

This invention provides a valve for diverting fluid flow in a tandem fan type engine. The valve comprises an axially displaceable sleeve 38 which is provided with two circumferentially extending sealing lands 40, 42 which in operation cooperate with two locating surfaces 50, 52 provided on the duct 22 between the first and second compressors 20, 24 of said engine to seal an outlet opening 36. The free unsprung length between the sealing lands 40, 42 is greater than the length between the locating surfaces 50, 52. Gas pressure is used to compress a contractable portion 54 in said sleeve and hence ensure sealing takes place between both pairs of locating surfaces and sealing lands. This apparatus ensures centralisation of the upstream and downstream ends of the sleeve 38 is independently obtainable and accommodates thermal expansion differentials between the sleeve 38 and the duct 22.

11 Claims, 5 Drawing Sheets

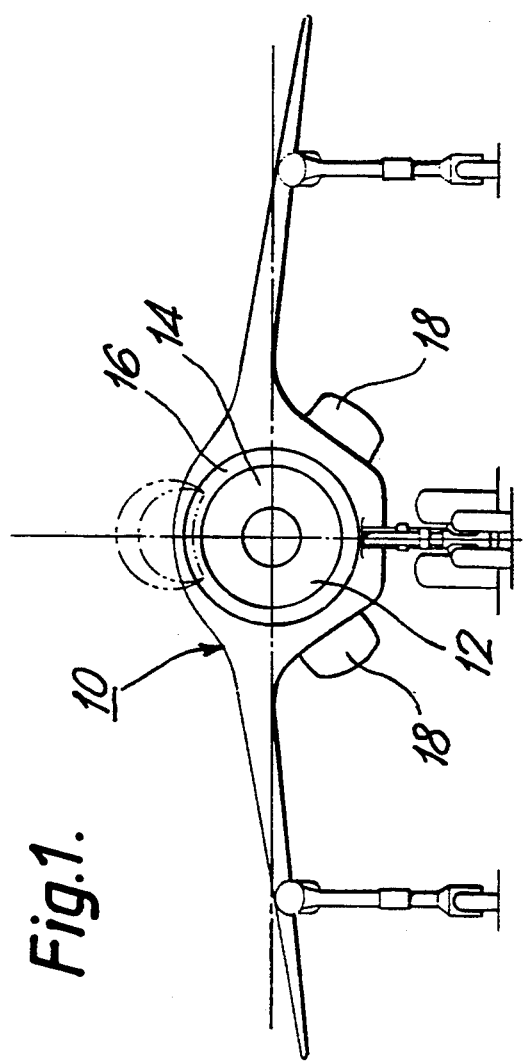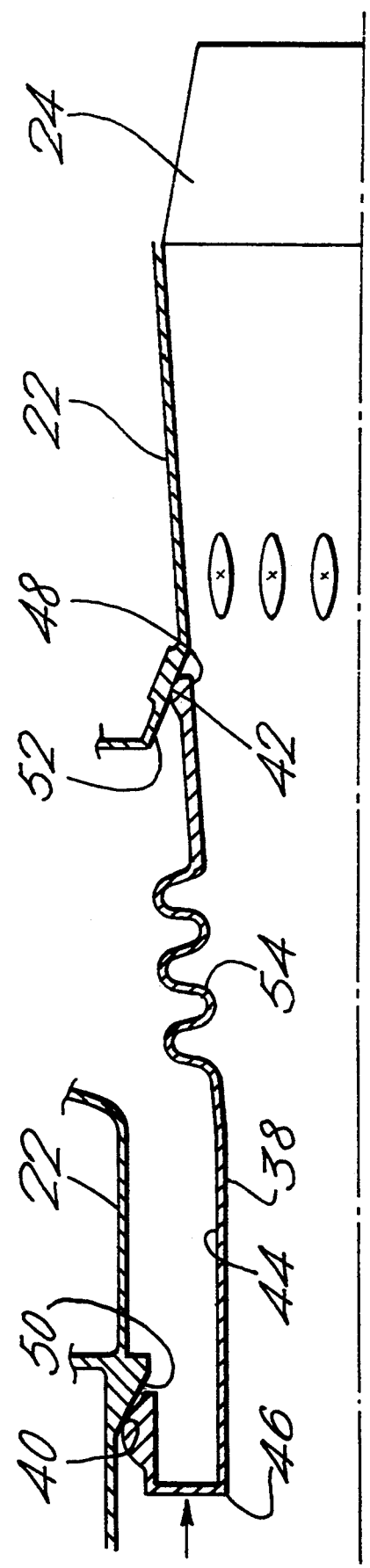

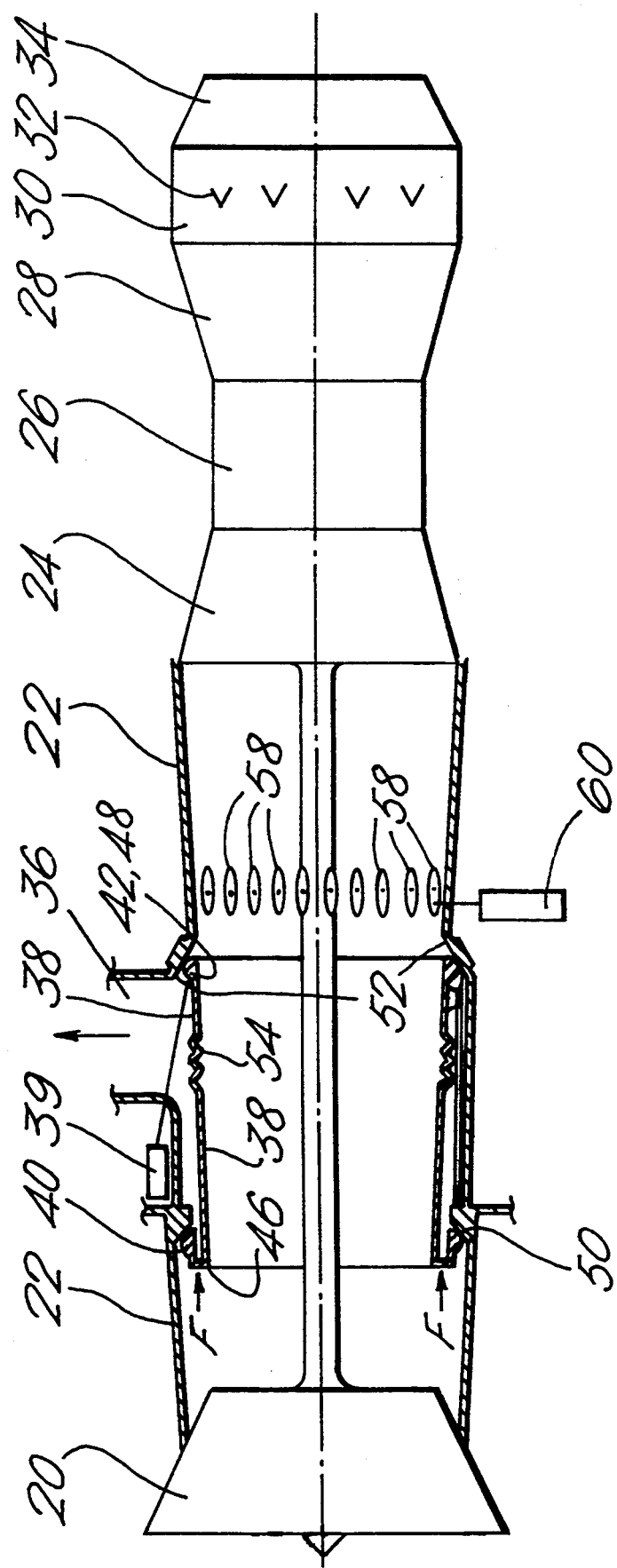

VALVE FOR DIVERTING FLUID FLOWS IN TURBOMACHINES

This invention relates to variable cycle gas turbine engines, and particularly to valves for selectively changing the direction of flow through the engine.

The present invention is particularly concerned with variable cycle engines of the type generally disclosed in US Pat. Nos. 3,913,321 or 4,038,818 (assigned to Rolls-Royce plc). In general, these engines comprise a first axial flow compressor and a core engine comprising, in flow series, a second compressor, combustion equipment, and turbines to drive the first and second compressors. The engines are capable of operating in two distinct modes, namely a "series flow" mode and a "parallel flow" mode. In the series flow mode the first and second compressors are connected in flow series and the whole output flow of the first compressor supercharges the second compressor. In the parallel flow mode the output flow of the first compressor is prevented from supercharging the second compressor and is discharged to ambient air through either a by-pass duct or through fixed or vectorable discharge nozzles, whilst an auxiliary air intake is opened to allow air to enter the second compressor.

Variable cycle engines of the type described above offer many advantages, particularly for aircraft requiring vertical take-off and landing and also supersonic forward flight. The engine performance can be optimised for vertical take-off and landing and subsonic flight during the parallel flow and optimised for forward supersonic flight during the series flow mode.

To enable the output flow from the first compressor to be redirected selectively for series or parallel modes of operation, it is usual to provide a diverter valve downstream of the first compressor. Examples of such diverter valves are described in the above mentioned patents. The problems associated with prior known diverter valves resides in their complexity, weight, cost and disruptive effect on the thermodynamic cycle of the engine during transition from the series flow mode to the parallel flow mode. It is very difficult to achieve transition between modes without inducing variations in flow conditions at the inlet to the second compressor. These variations may be localised and vary circumferentially around the fluid flow annulus of the second compressor. In general, some of these problems are due to the speed of the operation of the diverter valve means and the fact that many movable parts such as doors and flaps are positioned in the airflow path and have to be operated in unison.

An object of the present invention is to provide a variable cycle engine of the type described above with a diverter valve means which is simple to operate, is lightweight, of simple design, relatively inexpensive and provides a relatively uncluttered flow path during both modes of operation.

The invention will now be described by way of example only with reference to the accompanying drawings, in which:

FIG. 1 is a front elevation of an aircraft incorporating the present invention.

FIG. 2 and FIG. 3 are cross sectional views of tandem fan type engines incorporating the present invention.

FIG. 4 is a cross sectional view of a portion of the engines shown in FIGS. 2 and 3 and illustrates the invention in more detail.

Referring briefly to FIG. 1, an aircraft 10 is provided with a gas turbine engine 12 of the tandem fan type (best seen in FIGS. 2 and 3) and a pair of air inlets shown at 14 and 16 respectively. The first intake supplies a constant flow of air to the first axial flow compressor (not shown) whilst the second auxiliary intake acts to supply air to the second axial flow compressor as and when required. A pair of front vectorable nozzles 18 are employed to vent the exhaust gasses from the first axial flow compressor to atmosphere when the engine 12 is operated in the parallel mode of operation.

Figure 2:
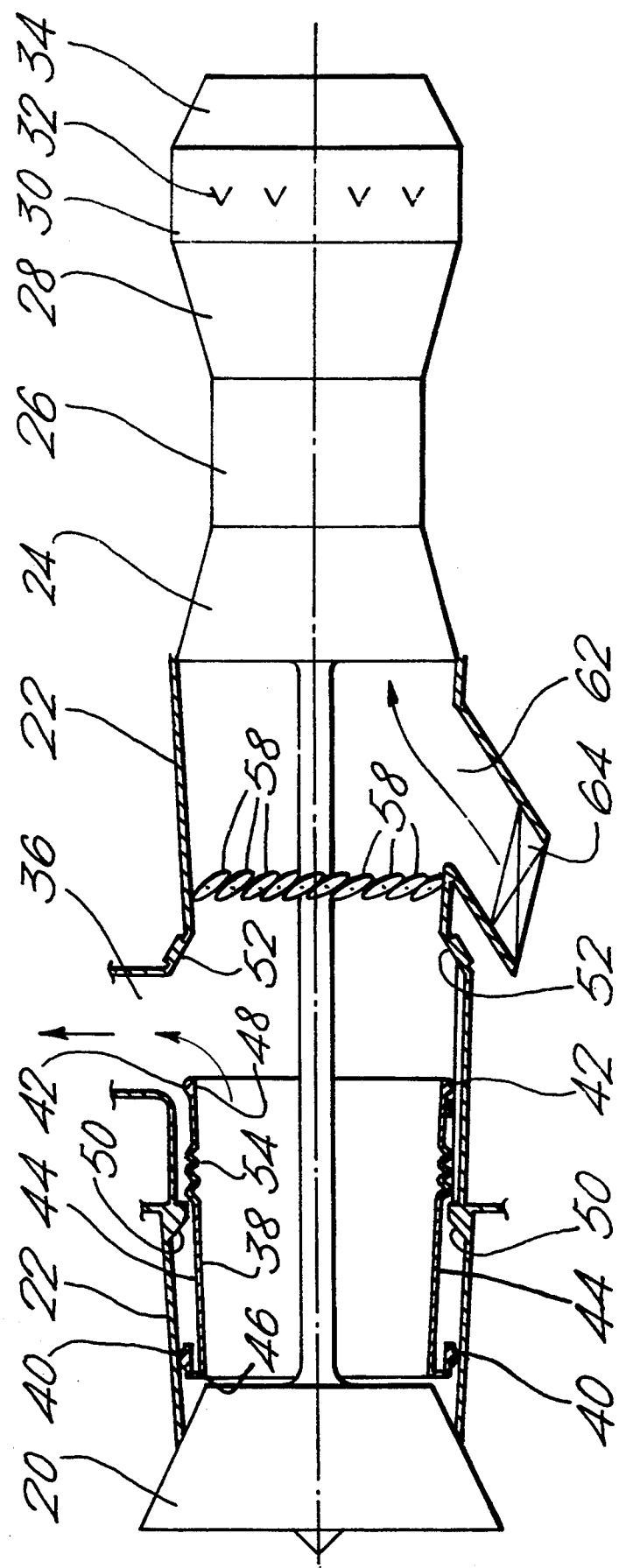

Referring now to FIGS. 2 and 3, a tandem fan type engine 12 comprises, in flow series, a first axial flow compressor 20, a fluid flow duct 22, a second axial flow compressor 24, combustion means 26, turbine means 28 connected to the compressor means to drive the compressor means 20, 24, a jet pipe 30 having an afterburner situated therein at 32 and a rear exhaust nozzle 34 which may be vectorable. An air outlet opening 36 is provided in the duct wall 22 at a region between the first and second compressors 20, 24 respectively. A valve for diverting the fluid flow in the duct is formed by a tubular sleeve 38 which extends co-axially along the duct 22 and which is movable between a first retracted position in which it allows air from the first compressor to enter the outlet opening 36, and a second deployed position (shown in FIGS. 3 and 4) in which it acts to cover the outlet opening 36 and prevent air entering therein. An actuator 39 is provided to move the sleeve 38 between its two positions. The sleeve 38 is provided with a first and a second circumferentially extending sealing land 40, 42, at its upstream and downstream end 46, 48 respectively of its radially outer surface. Each land 40, 42 comprises a convexed surface which extends radially inward as it extends axially rearwards. A first upstream and a second downstream locating surface 50, 52 are provided on the inner surface of the duct wall 22, the first of which is positioned upstream of the outlet 36 and the second of which is positioned downstream of said outlet. Each locating surface 50, 52 extends circumferentially around the duct and comprises a substantially conical flat surface which extends radially inward as it extends axially rearwards. In the specific embodiment shown the locating surfaces are conical in form. The sleeve 38 are further provided with a contractable portion 54 between its first and its second end 46, 48 respectively. In the drawings, the contractable portion 54 is shown as a series of corrugations which allow the sleeve to shorten its length when subjected to an axial load F and allow each end to centralise itself relative to the duct wall 22 independently of the other end. It will be appreciated however that alternative contractable portions may be provided and that the contractable portion 54 may exert a resilient load if desirable. The free undeformed axial length of the sleeve between the two sealing lands 40, 42 is greater than the free axial distance between the two locating surfaces 50, 52 by a pre-determined amount. The sleeve 38 is further provided with a pressure portion 56 upstream of the contractable portion 54 which experiences the rearwardly acting gas pressure load F produced by the compressed air exiting from the first axial flow compressor 22. In the drawings, the pressure portion 56 is formed by the upstream end portion 46 of the sleeve however it will be appreciated that alternative shaped and positioned portions may be used.

A means for obturating the duct is shown diagrammatically at 58 and positioned downstream of the second locating surface. The means shown comprises a plurality of blocker vanes positioned across the duct, which are movable between a first position, in which they act to block the duct, as shown in FIG. 2, and a second position, in which they act to allow air from the first axial flow compressor to enter the second axial flow compressor 24. An actuator shown schematically at 60 is provided to move the vanes 58 between their first and their second positions as and when required.

The auxiliary air intake 16 shown in FIG. 1 communicates with an auxiliary inlet opening 62 provided in the duct wall 22 downstream of the vanes 58 and acts to supply air to the second axial flow compressor when the vanes 58 obturate the duct. A valve means shown diagrammatically at 64 may be employed to close off the auxiliary air intake 16 when it is not in use. The outlet opening 36 may be sealed by translating the sleeve rearwardly to the position shown in FIG. 4. Initially, the sleeve's second downstream sealing land 42 contacts the second downstream, locating surface 52 and the downstream end 48 of the sleeve is centralised and sealed against the locating surface 52 by the pressure exerted by the actuator 39. Subsequently the gas pressure F experienced by the sleeve's upstream end 46 acts to deform the contractable portion such that the upstream sealing land 40 centralises and engages upon the upstream locating surface 50. By employing the above sealing technique thermal mis-match and concentricity between the sleeve 38 and the duct 22 may be accommodated without compromising sealing efficiency.

In order to operate the engine in the parallel flow mode as shown in FIG. 2, the sleeve 38 is translated forwards to allow air from the first-axial flow compressor to enter the outlet opening 36 and vent to atmosphere via the aircraft's front vectorable nozzles 18 whilst the vanes 54 are used to block the duct 22 and allow air from the auxiliary intake 16 to enter the second axial flow compressor. Air which enters the second axial flow compressor 24 is vented to atmosphere via the rear vectorable nozzle 34. It will be appreciated that if a valve is employed in the auxiliary air intake it will be necessary to open it during this mode of operation.

Operation of the engine in the series flow mode may be achieved by translating the sleeve 38 rearwards such that it obturates the outlet opening 36 and opening the vanes 54 such that all the air from the first compressor 20 supercharges the second compressor 24 and vents to atmosphere via the rear nozzle 34. It will be appreciated that in this mode of operation the auxiliary intake is redundant and may be blocked off.

Figure 5:
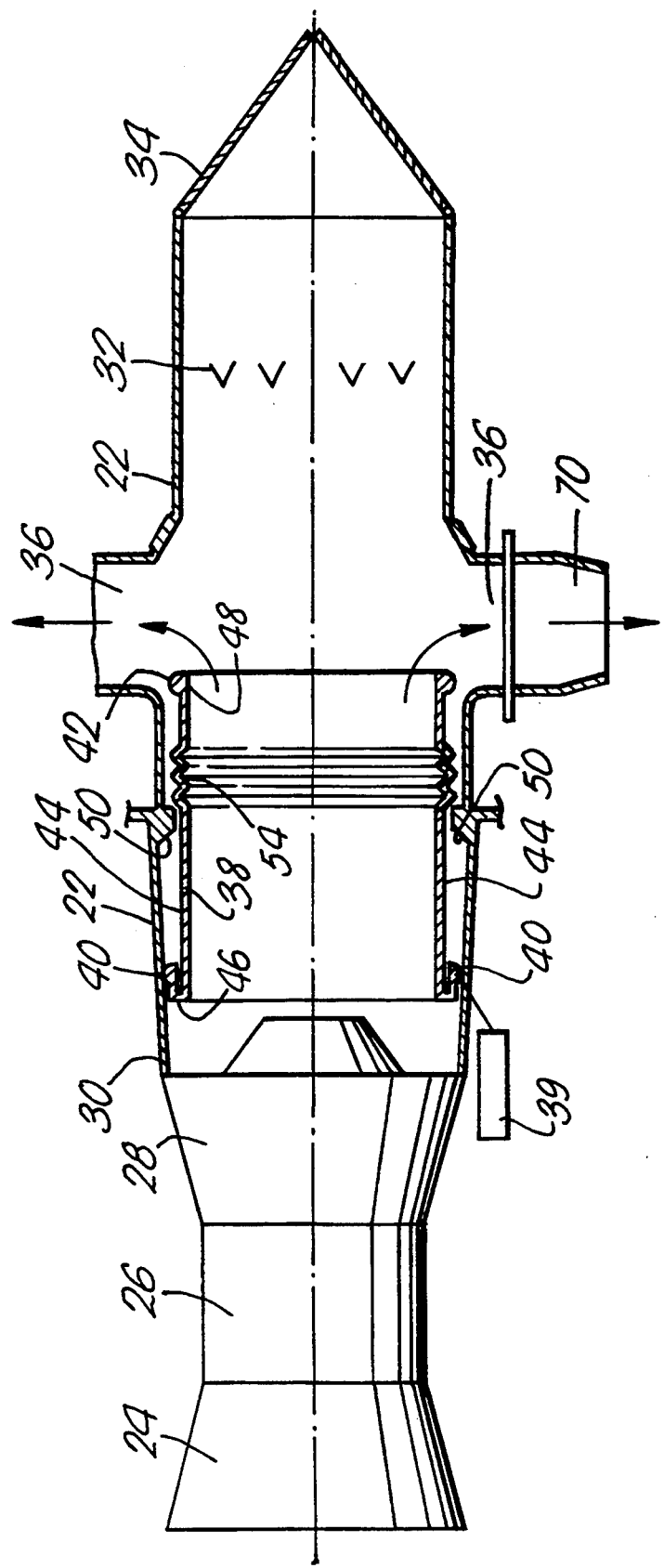
FIGS. 5 and 6 illustrate the present invention when applied to the exhaust duct of a conventional engine.
Figure 6:
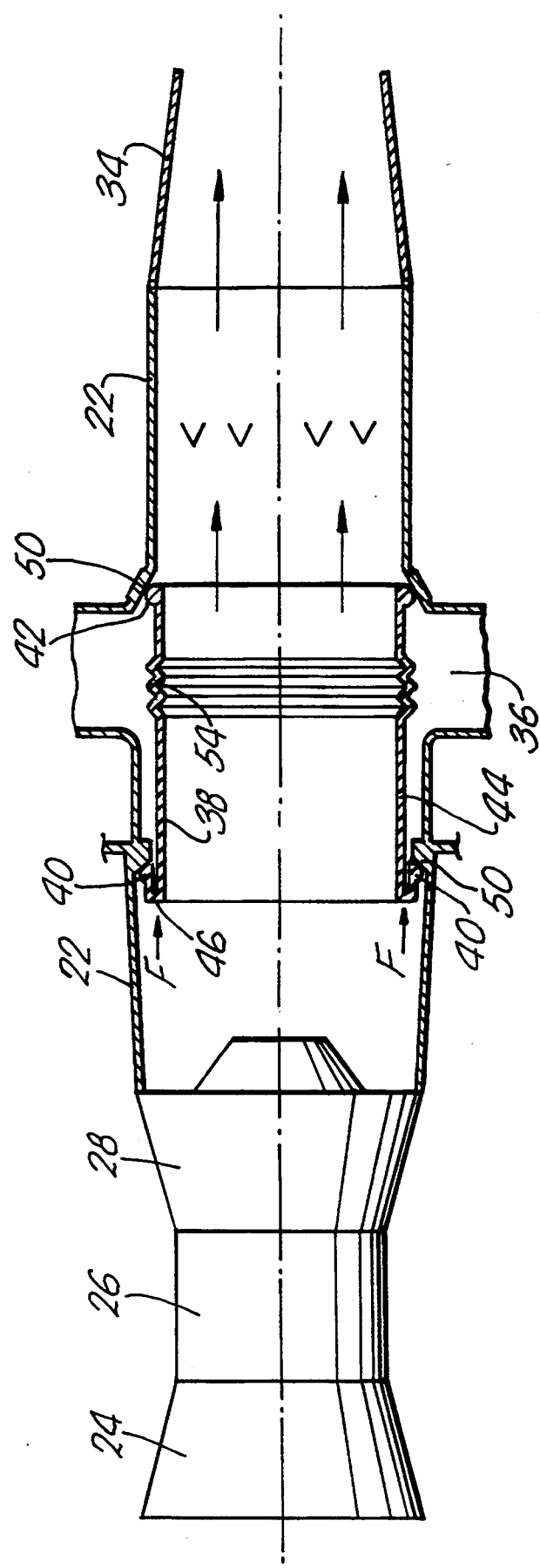

Referring now to the FIGS. 5 and 6, it will be appreciated that the present invention may be applied to engine layouts other than tandem fan arrangements. FIG. 5 illustrates a conventional engine having inflow series a compressor 24, combustion equipment 26, a turbine 28 and a fluid flow duct 22 which terminates in a rear nozzle 34 and is provided with one or more air outlets openings 36 upstream of the nozzle 34. A tubular sleeve valve 38 exactly as previously described is provided in the duct 22 and is movable by an actuator 39 between a first retracted position in which it allows exhaust gasses from the engine to enter the outlet openings 36 and a second deployed position in which it acts to cover the outlet openings 36. The rear exhaust nozzle 34 is capable of obturating the outlet from the duct 22 when the valve 38 is in its first position and unobturating the outlet when the valve 38 is in its second position. The duct 22 is exactly as previously described in that it is provided with locating surfaces 50, 52 which co-operate with the first and second lands 40, 42 on the sleeve to seal the duct 22 when the valve 38 is closed. The outlet openings 36 in the embodiments shown in FIGS. 5 and 6 provide air to front and rear vectorable nozzles 18 and 70 respectively, the operation of which are well known in the art and therefore not described herein.

I claim:

1. A valve for diverting fluid flows a turbomachine of the type that comprises:
    a fluid flow duct, having a duct wall;
    a first and a second axial flow compressor, spaced from each other along the duct;
    combustion means situated downstream of the compressors;
    turbine means, situated downstream of the combustion means and connected to the compressors to drive the compressors;
    an air outlet opening, provided in the duct wall at a region between the first and the second compressor, and an auxiliary air intake, provided in the duct wall at a region between the outlet opening and the second compressor;
    the valve comprising, a tubular sleeve having an upstream end and a downstream end and extending co-axially along the duct and being movable along said duct between a first, retracted, position in which it uncovers the outlet opening and a second, deployed, position in which it obturates the outlet opening, said sleeve being provided with a circumferentially extending sealing land at its upstream end and at its downstream end which engage upon first and second locating surfaces respectively provided on the duct when said sleeve is in its second deployed position.

2. A valve as claimed in claim 1 in which each sealing land comprises a convexed surface which extends radially inward as it extends axially rearward and the locating surfaces comprise a substantially flat surface which extends radially inwardly as it extends axially rearwardly.

3. A valve as claimed in claim 1 in which the sealing lands are both positioned on a radially outer surface of the sleeve, and the locating surfaces are provided on a radially inner surface of the duct.

4. A valve as claimed in claim 1 in which the sealing land at the first end of the sleeve and the first locating surface are each provided upstream of the outlet opening in the duct.

5. A valve as claimed in claim 1 in which there is further provided a means for obturating the duct which is situated downstream of the outlet opening in said duct and upstream of the second compressor.

6. A valve as claimed in claim 5 in which the second locating surface is provided downstream of the air outlet and upstream of the means for obturating the duct.

7. A valve as claimed in claim 1 in which a contractable portion is provided between the first and second ends of the sleeve.

8. A valve as claimed in claim 1 in which the sleeve is provided with a contractable portion between the first and second ends of the sleeve and a pressure portion upstream of the contractable portion which extends into the flow of air passing through the flow duct.

9. A valve as claimed in claim 8 in which the pressure portion comprises the upstream end of the sleeve.

10. A valve as claimed in claim 7 in which the undeformed free length between the two sealing lands on the sleeve is greater than the free length between the two locating surfaces on the duct.

11. A valve as claimed in claim 8 in which gas pressure produced by the first axial flow compressor acts on the pressure portion to urge the sealing land on the first end of the sleeve into contact with the first locating surface when the sleeve is in its second, deployed, position.

* * * * *